(12) United States Patent
Calderon Rico et al.

(10) Patent No.: US 12,442,881 B2
(45) Date of Patent: Oct. 14, 2025

(54) EQUILIZATION FOR MAGNETIC RESONANCE IMAGING (MRI) SIGNALS

(71) Applicant: KONINKLIJKE PHILIPS N.V., Eindhoven (NL)

(72) Inventors: Rodrigo Calderon Rico, Gainesville, FL (US); Alton Keel, Gainesville, FL (US); Tracy Allyn Wynn, Gainesville, FL (US); Arne Reykowski, Newberry, FL (US); Scott Bradley King, Gainsville, FL (US)

(73) Assignee: Koninklijke Philips N.V., Eindhoven (NL)

( * ) Notice: Subject to any disclaimer, the term of this patent is extended or adjusted under 35 U.S.C. 154(b) by 231 days.

(21) Appl. No.: 18/279,242

(22) PCT Filed: Feb. 23, 2022

(86) PCT No.: PCT/EP2022/054558
§ 371 (c)(1),
(2) Date: Aug. 29, 2023

(87) PCT Pub. No.: WO2022/184526
PCT Pub. Date: Sep. 9, 2022

(65) Prior Publication Data
US 2024/0133989 A1  Apr. 25, 2024
US 2024/0230814 A9  Jul. 11, 2024

Related U.S. Application Data

(60) Provisional application No. 63/156,379, filed on Mar. 4, 2021.

(51) Int. Cl.
*G01R 33/58* (2006.01)
*G01R 33/36* (2006.01)

(52) U.S. Cl.
CPC ....... *G01R 33/583* (2013.01); *G01R 33/3621* (2013.01)

(58) Field of Classification Search
CPC .......................... G01R 33/3621; G01R 33/583
See application file for complete search history.

(56) References Cited

U.S. PATENT DOCUMENTS 10,408,901 B2 * 9/2019 Taniguchi .......... G01R 33/3854
10,509,085 B2 * 12/2019 Leussler ............. G01R 33/3614
(Continued)

FOREIGN PATENT DOCUMENTS

EP     1664820 A1    6/2006

OTHER PUBLICATIONS

International Search Report and Written Opinion from PCT/EP2022/054558 mailed Jul. 20, 2022.
(Continued)

*Primary Examiner* — Gregory H Curran (57) ABSTRACT

A magnetic resonance (MR) system includes an MR receive channel (20) including: an MR coil element (22) configured to receive MR signals in an MR frequency band; an electronic signal processing chain (24) configured to process the MR signals received by the MR coil element to produce processed MR signals, wherein the electronic signal processing chain includes an equalization filter (26); and a signal injector (8, 16, 28, 38, 38D) configured to input a reference radio frequency (RF) signal in the MR frequency band to the signal processing chain, wherein the signal processing chain processes the reference RF signal to generate a processed reference RF signal. Equalizer electronics (30) are configured to adjust the equalization filter based at least on the processed reference RF signal such that the MR receive channel has a flat frequency response over the MR frequency band.

20 Claims, 6 Drawing Sheets

(56) References Cited

U.S. PATENT DOCUMENTS

| | | |
|---|---|---|
| 2009/0140739 A1 | 6/2009 | Bennett |
| 2009/0302845 A1 | 12/2009 | Biber |
| 2010/0033180 A1 | 2/2010 | Biber et al. |
| 2010/0329527 A1* | 12/2010 | Iannotti ............ G01R 33/3685 382/131 |
| 2012/0020259 A1 | 1/2012 | Bollenbeck et al. |
| 2012/0319884 A1 | 12/2012 | Bollenbeck et al. |
| 2013/0119982 A1 | 5/2013 | Pirkl |
| 2014/0062480 A1 | 3/2014 | Bollenbeck et al. |
| 2015/0285887 A1 | 10/2015 | Bollenbeck |

OTHER PUBLICATIONS

Wiehl, Michael, "Channel impulse response inside a magnetic resonance imaging device at 0.8 GHz to 27 GHz", Mikon 2012, 19th International Conference on Microwaves, Radar and Wireless Communications, May 21-23, Warsaw, Poland.

Alsindi, Nayef A et al., "Ultra-Wideband Channel Measurement Characterization for Wireless Magnetic Resonance Imaging Applications," 41st Annual Conference on Information Sciences and Systems, 2007. CISS '07.

Shang, Yue, "Performance Analysis of WiMedia UWB System for Medical Applications With Human Blockages," Proceedings of 17th International Conference on Computer Communications and Networks, 2008. ICCCN '08.

\* cited by examiner

EQUALIZATION FOR MAGNETIC RESONANCE IMAGING (MRI) SIGNALS

CROSS REFERENCE TO RELATED APPLICATIONS

This application is a U.S. national phase application of International Application No. PCT/EP2022/054558 filed on Feb. 23, 2022, which claims the benefit of U.S. Application Ser. No. 63/156,379 filed on Mar. 4, 2021 and is incorporated herein by reference.

FIELD

The following relates generally to the magnetic resonance (MR) imaging arts, MR coil arts, MR coil element design arts, MR signal acquisition arts, and related arts.

BACKGROUND

Magnetic resonance (MR) imaging entails placing a subject (e.g., medical patient, veterinary subject, archaeological mummy, etc.) in a static magnetic field (often referred to as a $B_0$ field) and exciting nuclear magnetic resonance in the subject and then detecting the excited magnetic resonance. For imaging, the excited MR is spatially encoded with respect to location, phase, and/or frequency by superimposing magnetic field gradients on the static $B_0$ magnetic field during the excitation, during a time interval between MR excitation and MR readout, and/or during the MR readout. In a typical design, the MR imaging device (sometimes referred to as an MRI scanner) includes a housing with a central bore within which the MR examination region is located. The static $B_0$ magnetic field is produced by solenoidal magnet windings wrapped around the central bore and housed within the MRI scanner housing. These solenoidal magnet windings are often superconducting windings in modern MRI scanners, and the housing includes a liquid helium (LHe) reservoir cooling the superconducting windings. Magnetic field gradient coils are also disposed in the housing around the central bore.

To provide the MR excitation in the case of a human subject, a body coil is commonly used, which is typically a cylindrical birdcage coil, TEM coil, or some variant thereof that is installed concentrically around the bore. Alternatively, a local coil positioned near the body anatomy to be imaged is used for excitation. MR readout is usually performed using a local MR receive coil positioned near the anatomy to be imaged. The local MR receive coil and the local MR excitation coil readout (if used) may be the same coil, or different coils. For various reasons, the MR receive coil (and MR excitation coil, if used) may comprise an MR coil that includes one or more coil elements, with each coil element typically configured as a loop coil, although other coil element designs are known. Each coil element has an associated signal processing chain that typically includes at least a preamplifier that boosts the (usually weak) received MR signal strength prior to being ported off the MR coil. The signal processing chain may also include other components; for example, some MR coils include analog-to-digital converters (ADCs) for digitizing the received and pre-amplified MR signals prior to being ported off the coil. This provides a digital MR coil. The MR coil element and the signal processing chain are designed to have a flat amplitude and phase response over the MR frequency band (that is, the frequency band in which MR signals are credibly expected to be located).

The following discloses certain improvements to overcome these problems and others.

SUMMARY

In some embodiments disclosed herein, a MR system includes an MR receive channel including: an MR coil element configured to receive MR signals in an MR frequency band; an electronic signal processing chain configured to process the MR signals received by the MR coil element to produce processed MR signals, wherein the electronic signal processing chain includes an equalization filter; and a signal injector configured to input a reference radio frequency (RF) signal in the MR frequency band to the signal processing chain, wherein the signal processing chain processes the reference RF signal to generate a processed reference RF signal. Equalizer electronics are configured to adjust the equalization filter based at least on the processed reference RF signal such that the MR receive channel has a flat frequency response over the MR frequency band.

In some embodiments disclosed herein, a MR system includes an MR channel with an MR coil element and an electronic signal processing chain wherein the electronic signal processing chain includes an equalization filter. Equalizer electronics are configured to equalize the MR channel over an MR frequency band by adjusting the equalization filter based on a processed reference RF signal that has been one of: (i) received by the MR coil element and then processed by the electronic signal processing chain; or (ii) processed by the electronic signal processing chain and then transmitted by the MR coil element and received by an associated signal injector.

In some embodiments disclosed herein, a MR method includes: operating an MR channel including an MR coil element and an electronic signal processing chain with an equalization filter to one of (i) receive MR signals generated by patient or (ii) transmit MR excitation signals into a patient whereby MR signals are generated by the patient; and equalizing the MR channel over an MR frequency band by adjusting the equalization filter based on a reference RF signal that has been one of (i) received by the MR coil element and then processed by the electronic signal processing chain or (ii) processed by the electronic signal processing chain and then transmitted by the MR coil and received by an associated calibration antenna.

One advantage resides in providing equalization to improve the performance of MRI coils.

Another advantage resides in providing an antenna coupled to an MRI coil to send a reference signal to the MRI coil in order to perform the equalization.

Another advantage resides in providing MRI electronics to access both the complex spectrum of the reference RF signal and the corresponding RF signal output by the MRI coil after signal processing.

Another advantage resides in calibrating an MRI coil while the MRI coil is placed on a patient to be imaged.

Another advantage resides in providing a compact, unitary MR coil with on-board equalization.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

FIG. 1 diagrammatically illustrates a magnetic resonance (MR) imaging device including a MR coil element in accordance with the present disclosure.

DETAILED DESCRIPTION

As previously described, an MR channel comprising an MR coil element its signal processing chain is designed to have a flat complex (i.e., both amplitude and phase) spectral response over the MR frequency band. However, it is recognized herein that hardware design may be insufficient to provide a sufficiently flat spectral response for some MR imaging tasks. Moreover, the spectral response of the MR coil element may depend significantly on its environment. For example, the imaging subject (e.g., medical patient, veterinary subject, or the like) to which the MR coil element is coupled may distort the spectral response of the MR coil element. Likewise, proximity of the coil to other hardware of the MRI scanner can distort the spectral response of the coil element.

The following discloses approaches for improving the performance of an MRI coil by performing equalization of the receive (or, in other embodiments, transmit) signal chain over its MR bandwidth.

Equalization per se is a known technique used in improving telegraphy and telephony signal chains and other radio communication signal chains. To perform equalization, a known reference RF signal is received and processed by the signal chain. The reference RF signal should cover the bandwidth being equalized with sufficient RF power over the entire band. An equalization filter is then adapted to adjust the RF signal as received and processed by the RF signal chain to be flat over the bandwidth. The equalization filter adaptation is done based on the complex spectrum (including amplitude and phase as a function of frequency) of the received/processed signal and further based on the complex spectrum of the reference RF signal.

However, attempting to apply equalization to an MR coil presents certain difficulties be due to issues particular to the MRI environment. First, a suitable calibration antenna must be available to send the reference RF signal to the MRI coil (or coil element) being calibrated. The calibration antenna must be coupled to the coil element being equalized, but should not be so strongly coupled that it distorts channel characteristics of the MRI coil element. Second, the filter adaptation entails relatively complex RF signal processing, and the electronics performing that processing should have access to both the complex spectrum of the reference RF signal and the corresponding RF signal output by the MRI coil after signal processing. Third, because the channel characteristics are affected by the imaging subject to which the MRI coil is coupled, a calibration process should be performed with the coil in place, preferably immediately before imaging data acquisition. This in turn requires the calibration to be very fast, and to preferably not impact the MRI imaging workflow.

In some embodiments disclosed herein, the body coil used for MRI excitation may serve as to also transmit the reference RF signal—however, the body coil can sometimes likely be so strongly coupled to the MRI receive coil that its use in transmitting the reference RF signal would likely distort the channel characteristics of the MRI receive coil. (In practice, the MRI receive coil is usually detuned during MRI excitation; or, if the coil has automatic gain control, AGC, then the gain is turned to a low setting during MRI excitation). In other embodiments, one of the various pickup coils disposed in the magnet bore is used to transmit the reference RF signal. These pickup coils are conventionally used for tasks such as checking the body coil and performing time alignment, but are disclosed herein to be repurposed to serve as the calibration antenna for MRI receive coil equalization.

In the case of a coil that includes a plurality of coil elements (i.e., a coil array), another possibility is to use one receive coil element as the coil for equalizing another receive coil element. In this embodiment, at least one receive coil element is coupled to a digital to analog converter (DAC) through a switch to enable the coil element to be connected to either the DAC (for use as the calibration antenna in equalizing another coil element) or to the analog-to-digital converter (ADC) used during the MRI receive phase. In a variant embodiment, an additional (i.e., auxiliary) coil element is added to the coil which is used only as the calibration antenna for equalizing the operative coil elements of the coil array.

In some embodiments, the coil has on-board equalization. The processing electronics in such a coil include an ADC, and the signal processing electronics of the coil are preferably implemented as a Field-Programmable Gate Array (FPGA) or other on-board digital signal processing (DSP) electronics of the MRI receive coil. MRI receive coils that are digital coils include on-board DSP implementing the coil element receive chains simultaneously and on-board. As such, these MRI receive coils can be modified by adding equalization programming to the FPGA or other DSP electronics, along with the addition of one or more DACs coupled to the coil elements and/or to an auxiliary coil element provided on the MRI coil. In this design, the on-board DSP electronics generate the digital reference RF signal which is output by the DAC and the designated antenna. As the on-board DSP electronics have access to (indeed, generate) the complex spectrum of the reference RF signal, and also have access to the RF signal output by the coil element/DSP chain, they have sufficient information to adjust an equalization filter inserted in the DSP chain. The receive chain DSP is also modified to implement the equalization filter in the DSP receive chain of the coil element.

Advantageously, in this embodiment the entire system for performing the equalization is built into the MRI receive coil. The equalization process is fast, typically a few milliseconds or less. As such, the on-board equalization can update the equalization filters for the coil elements at any time during which the MRI coil element is positioned on the patient (or other imaging subject). This enables updating the equalization filters for the coil elements for each patient and even for each MRI sequence or sub-sequence, in a manner that is transparent to the MRI workflow.

Some existing MRI systems do not employ on-board DSP electronics implementing the receive chain, but instead employ an external RF receiver, e.g., at the side of the MRI scanner. In these designs, the signal chain for each channel includes the MRI coil element, the pre-amplifier, the cable or wireless connection of the MRI coil to an external RF receiver, and the DSP signal chain implemented at the external RF receiver. In this case, the equalization electronics are suitably implemented at the external RF receiver. Here, the external RF receiver will need to be provided with the complex spectrum of the reference RF signal (unless an external transceiver is employed, in which the external RF transceiver is also used to transmit the reference signal). As a completely on-board equalization solution is not feasible in this case, one of the pickup coils, or the body coil, can be implemented as the calibration antenna for equalization. In another example, a transmission line in a cable connection runs from a transceiver on a side of a MR device magnet to a table connection of the coil.

The foregoing relates to calibration of an MRI receive coil. However, an analogous process can be performed for equalizing an MR transmit coil. To do so, a coil element of the transmit coil is used to transmit the reference RF signal, and a designated receive coil is used to receive the transmitted reference RF signal. The complex spectrum of the reference RF signal is compared with the complex spectrum of the received RF signal to generate the adapted equalization filter for the coil element of the transmit coil. The designated receive coil should preferably have a flat response over the bandwidth to be equalized. Achieving a flat response in the designated receive coil is simplified because (unlike the case of an MR receive coil that is placed near or on the imaging subject to acquire MR readout) the designated receive coil can be at a chosen fixed location in the bore of the MRI scanner.

In some embodiments, the equalization filter is preferably a Finite Impulse Response (FIR) filter, although an Infinite Impulse Response (IIR) or other digital filter could also be used. The reference RF signal is in one embodiment a 2PSK (phase reversal keying) signal commonly used in digital communications, although a sinc signal or other reference RF signal with sufficient power spanning the MR frequency band to be equalized is also suitable.

Figure 1:
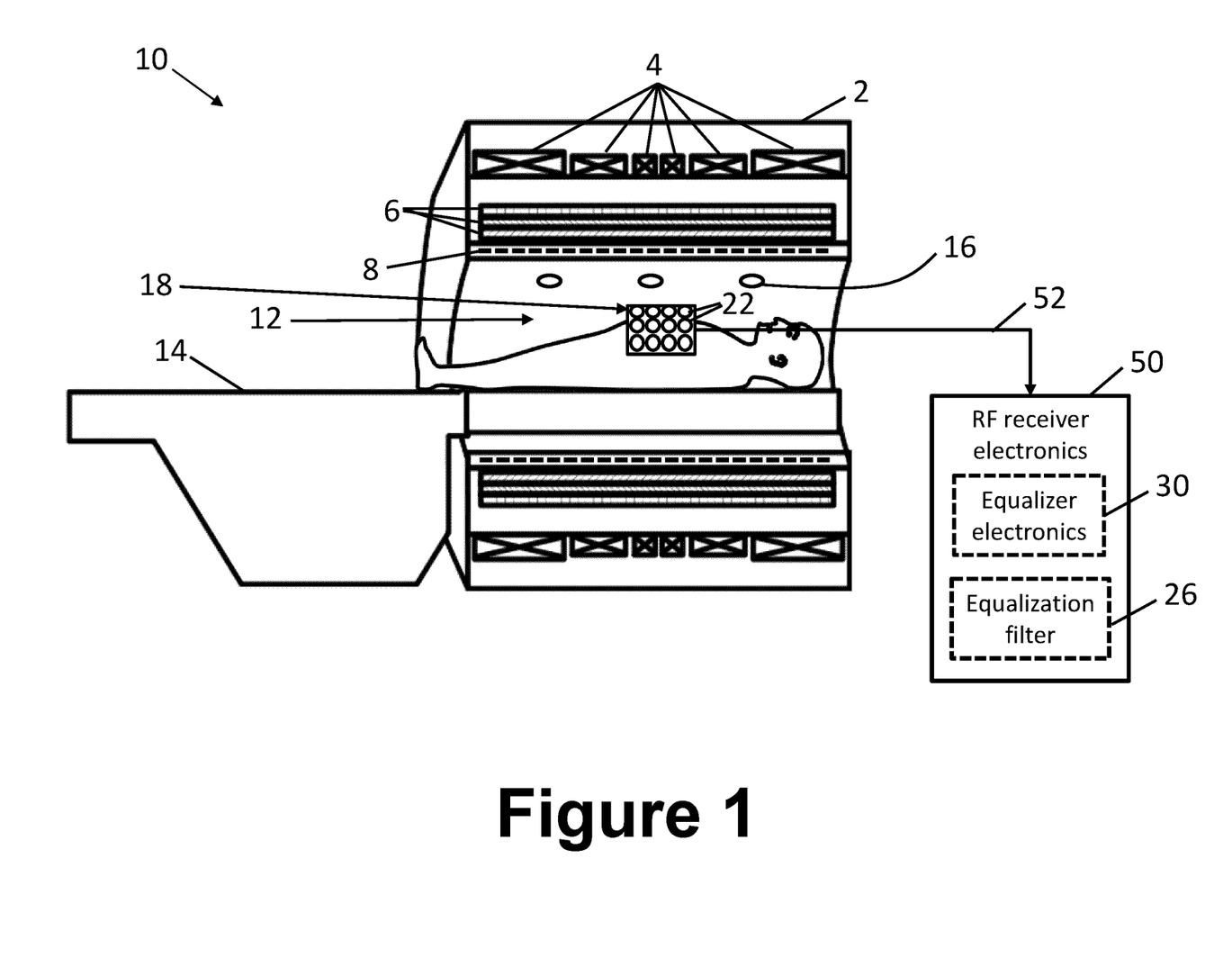

With reference to FIG. 1, an illustrative magnetic resonance (MR) imaging system or device 10 comprises a magnetic resonance (MR) imaging scanner, which in the illustrative example includes a housing or gantry 2 containing various components shown in FIG. 1 (in particular, Inset A of FIG. 1), such as by way of non-limiting illustrative example a superconducting or resistive magnet 4 generating a static ($B_0$) magnetic field, magnetic field gradient coils 6 for superimposing magnetic field gradients on the $B_0$ magnetic field, a whole-body radio frequency (RF) coil 8 for applying RF pulses to excite and/or spatially encode magnetic resonance in an imaging patient disposed in an MR bore 12 or other MR examination region, and/or so forth. The magnet 4 and the gradient coils 6 are arranged concentrically about the bore 12. A robotic patient couch 14 or other patient support enables loading a medical patient, a patient undergoing a medical screening, or other imaging patient into the MR bore 12 for imaging. The MR imaging system or device 10 may further include one or more pickup coils 16, which are usually placed at a fixed location, such as mounted on the wall of the bore 12 in the illustrative embodiment. The pickup coils 16 are typically used for tasks such as checking operation of the body coil 8 and/or performing time alignment.

The magnetic resonance excited in the imaging subject is read out by an MR receive coil 18 that, in the illustrative embodiment, includes a plurality of MR coil elements 22. (In the limit, the number of coil elements may be 1, that is, the coil may have only a single coil element). Each coil element 22 is a radio frequency antenna for receiving MR signals (or, in the case of a transmit coil, for transmitting MR excitation). Each coil element 22 forms an MR receive channel 20 as will be described next.

Figure 2:
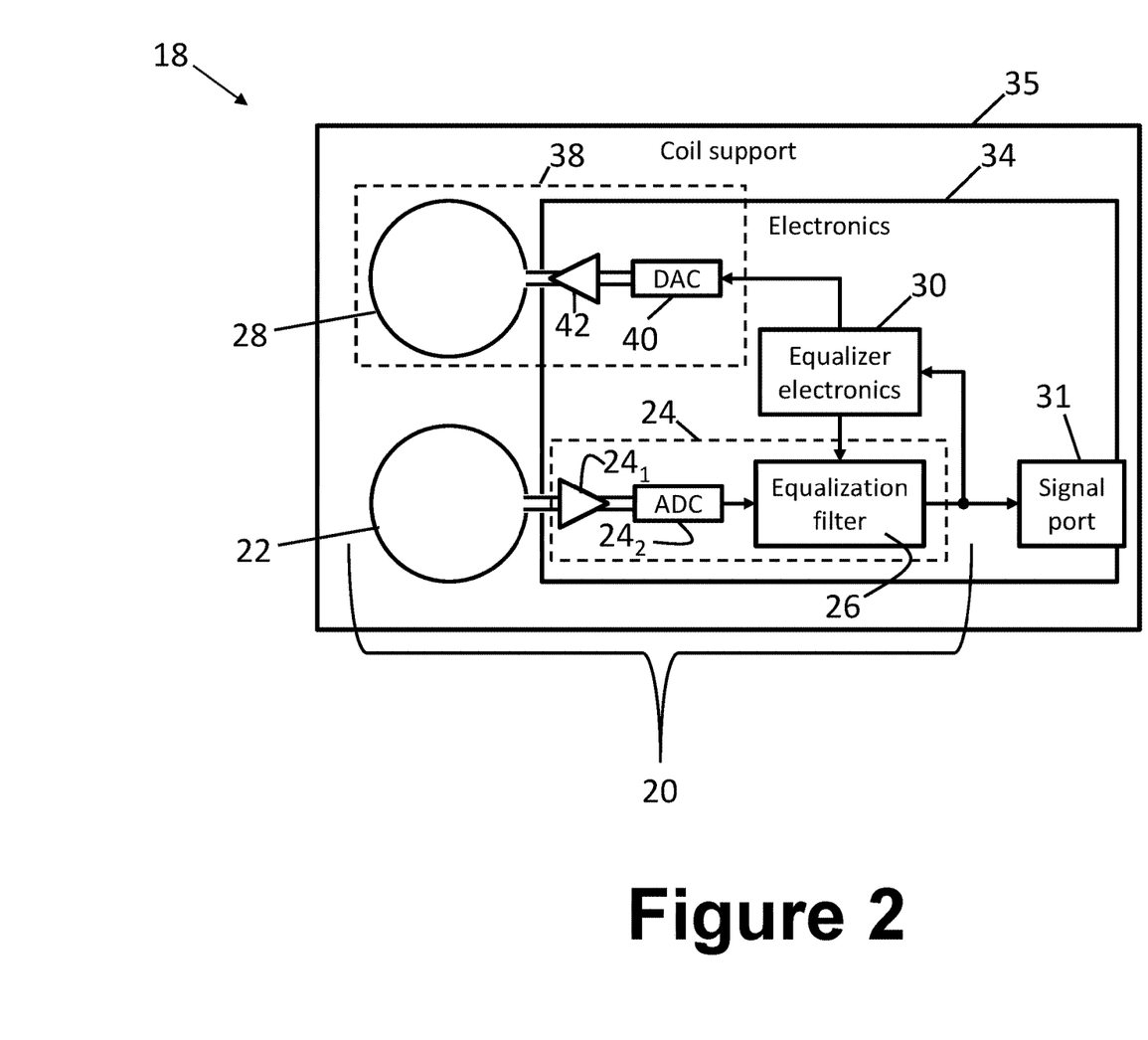
FIG. 2 diagrammatically illustrates another embodiment of a magnetic resonance (MR) imaging device including a MR coil in accordance with the present disclosure.

With reference now to FIG. 2, an illustrative MR coil 18 is shown, with a single illustrative coil element 22. It will be appreciated that the coil 18 may in general include any number of coil elements 22, e.g., 16 coil elements, 20 coil elements, 32 coil elements, etc. Each coil element 22 is part of an MR receive channel 20 that includes the MR coil element 22 configured to receive MR signals in an MR frequency band, and an electronic signal processing chain 24. The MR coil element 22 can be either a receive coil or a transmit coil. The illustrative coil element 22 is a single loop of copper, copper alloy, or another electrically conductive material, for example formed as a copper layer deposited on a circuit board, plastic sheet, plastic former, or other electrically insulating substrate; or alternatively formed as a freestanding metal loop. However, more generally the coil element 22 may be any suitable antenna capable of coupling with MR signals in the MR frequency band, e.g., a multi-loop coil or otherwise-shaped antenna. In some examples, MR coil 18 including the MR coil element(s) 22 is configured to be disposed in the examination region (i.e., the MR bore 12), as shown in FIG. 1. The MR receive channel 20 also includes the electronic signal processing chain 24 configured to process the MR signals received by the MR coil element to produce processed MR signals. For example, the illustrative electronic signal processing chain 24 includes a pre-amplifier 241 connected to the coil element 22 to amplify the (typically weak) received MR signals, and an analog-to-digital converter (ADC) 242 to convert the amplified MR signals to digital signals.

The electronic signal processing chain 24 as disclosed herein further includes an equalization filter 26 which is adjusted to flatten (i.e., equalize) the MR channel over an MR frequency band. The electronic signal processing chain 24 is configured to process the MR signals received by the MR coil element 22 to produce processed MR signals. In some examples, the equalization filter 26 comprises a finite impulse response filter (FIR). Alternatively, the equalization filter 26 can comprise any suitable filter (e.g., an infinite impulse response (IIR) or other digital filter).

As will be described, the equalization filter 26 is adjusted on the basis of a reference RF signal transmitted by a signal injector. In some embodiments, as shown in FIG. 2, the signal injector comprises a radio transmitter 38 including a calibration antenna 28. The calibration antenna 28 may be another coil element of the MR coil 18 (that is, the calibration antenna 28 may also serve as one of the MR coil elements 22 used in receiving MR signals). Alternatively, the calibration antenna 28 may be a dedicated calibration antenna 28 that is not one of the MR coil elements 22 used in receiving MR signals. This latter approach involves adding an additional calibration antenna 28 to the MR coil 18, but can have advantages as the dedicated calibration antenna 28 can be designed to have a flat frequency response over the MR frequency band (for example, a small antenna with flat frequency response). More particularly, equalizer electronics 30 adjust the equalization filter 26 based at least on the reference RF signal after processing by the MR receive channel 20 such that the MR receive channel 20 has a flat frequency response over the MR frequency band. The processed MR signal is ported off the coil 18 via a signal port 31. For example, in some embodiments, the coil 18 is a wired coil in which case the signal port 31 is suitably an electrical connector or a hardwired connection to an electric cable (e.g., a coaxial cable). In some embodiments, the coil 18 is a wireless coil and the signal port 31 is a wireless transmitter. In some embodiments, the coil 18 is an optically connected cable and the signal port 31 is an optical transducer/connector assembly where the optical transducer may, for example, be a semiconductor laser diode driven by the processed MR signals and launching light into an optical fiber connected at a connector of the optical transducer/connector assembly. These are merely illustrative examples.

In the embodiment of FIG. 2, the electronics 34 of the MR coil 18 including the electronic signal processing chain 24 (particularly including the equalization filter 26), the equalizer electronics 30, and an optional digital-to-analog (DAC) converter 40 and amplifier 42 (to be described) are constructed as on-board electronics 34 of the coil 18, and are mounted together with the coil element(s) 22 on a coil support 35. In this embodiment, the MR coil 18 comprises a set of MR coil elements 22 (only an illustrative one coil element 22 being shown in FIG. 2) and the coil electronics 34 constructed as an integral assembly, e.g., mounted on the coil support 35 which may by way of non-limiting illustrative example be a circuit board, a plastic sheet, a plastic former, an enclosed housing, and/or so forth. In this design, the equalizer electronics 30 adjust the equalizer filter 26 to equalize the MR channel 20, and this equalization functionality is thus built into the coil 18 of FIG. 2.

With reference back to FIG. 1, in some other embodiments the coil 18 may not include on-board DSP electronics implementing the receive chain, but instead may employ an external RF receiver 50, e.g., at the side of the MRI scanner. In these designs, the electronic signal processing chain 24 for each channel 20 typically includes the MRI coil element 22, the pre-amplifier 241, an electric or optical cable or wireless connection 52 of the MRI coil 18 to the external RF receiver 50, and further signal processing which in this embodiment is implemented at the external RF receiver 50. In this embodiment, the equalization electronics 30 and the equalization filter 26, as well as possibly other components of the electronic signal processing chain 24 such as the ADC 242, are suitably implemented at the external RF receiver 50, as diagrammatically indicated in FIG. 1.

In general, the equalizer electronics 30 operate as follows. A known reference RF signal is transmitted by a calibration antenna. This calibration antenna may, for example, be the body coil 8, or one of the pickup coils 16, or a different coil element 28 of the coil 18 that is different from the coil element 22 that is being equalized. The coil element 22 being equalized receives the transmitted reference RF signal and its electronic signal processing chain 24 processes the received reference RF signal to produce a processed RF signal. The equalizer electronics 30 then adjust the equalization filter 26 based at least on the processed reference RF signal such that the MR receive channel 20 has a flat frequency response over the MR frequency band. Depending upon the nature of the transmitted reference RF signal, the equalizer electronics 30 may adjust the equalization filter 26 further based on the reference RF signal prior to processing. For example, if the calibration antenna is the pickup coil 16 which is known to output the reference RF signal as a flat signal over the MR frequency band (e.g., due to the fixed position and hardware design of the pickup coil 16), then the equalizer electronics 30 may not need access to the reference RF signal prior to its reception and processing by the MR channel 20.

On the other hand, if the on-board coil element 28 is used as the calibration antenna, then it may not be safe to assume the reference RF signal is flat over the MR frequency band. For example, the reference RF signal may be distorted due to proximity to the imaging subject. In this case, the equalization electronics 30 will further base the adjustment of the equalization filter 26 on the reference RF signal. In the illustrative embodiment of FIG. 2, this is readily achieved by having the equalizer electronics 30 generate the reference RF signal and transmit it via a radio transmitter 38 that includes a digital-to-analog (DAC) converter 40 coupled to the different MR coil element 28. In this approach, the different MR coil element 28 may be an operational coil element of another channel of the MR coil 18 (which in this approach must be a multi-channel MR coil with an MR coil elements set that includes at least both coil elements 22, 28). In this case, the different coil element 28 is itself connected to a (separate) electronic signal processing chain corresponding to the signal processing chain 24 of the coil element 22, with suitable RF switches to enable switching the coil element 28 between receive and transmit modes. Alternatively, the different MR coil element 28 may be a dedicated coil element that is used only as the calibration antenna for equalizing the illustrated MR channel 20 and any other MR channels of the MR coil 18. This alternative approach advantageously simplifies design (e.g., by avoiding the need for transmit/receive switches) at the cost of an additional coil element 28 that does not contribute to MR data acquisition.

With reference back to FIG. 1, in the case in which the equalizer electronics 30 and the equalization filter 26 are implemented at the off-board RF receiver electronics 50, the equalizer electronics 30 either operate on the assumption that the reference RF signal before processing by the MR channel 20 is flat, or must have knowledge of the reference RF signal before the processing. In the latter case, one approach is for the RF receiver electronics 50 to include a radio transmitter (so that it is actually a transceiver) or be in communication with a radio transmitter that energizes the calibration antenna to transmit the reference RF signal.

In any of the foregoing embodiments, the equalizer electronics 30 suitably adjust the equalization filter 26 to flatten the frequency response of the MR receive channel 20 over the MR frequency band as follows.

Figure 3:
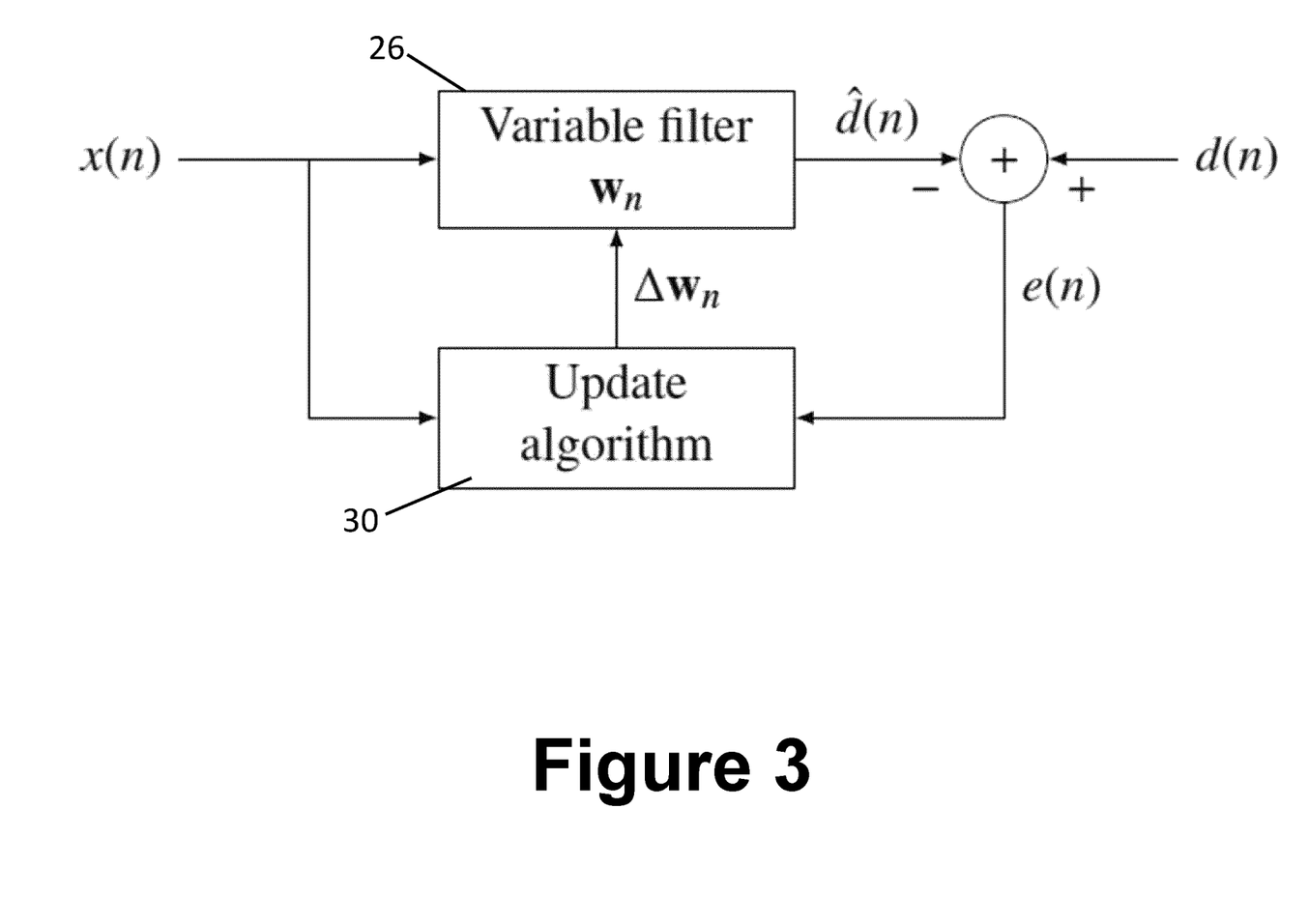
FIG. 3 diagrammatically illustrates an operation of a filter of the MR imaging device in accordance with the present disclosure.

Referring now to FIG. 3, the equalization filter 26 can be an adaptive equalization filter 26 can automatically adapt to a time-varying communication channel, which can be often used to minimize effects associated with multipath propagation and doppler spreading. An adaptive equalization filter 26 is a form of adaptive filter where the filter coefficients are changed to optimize one or more filter characteristics. For example, in the case of a linear discrete time filter, the filter can be adapted according to Equation 1:

$$w = R^{-1} p \qquad (1)$$

where w is a vector of filter coefficients, R is a received signal covariance matrix and p is a cross-correlation vector between a tap-input vector and a desired response (the latter two are generally not known but estimated during the adaptive equalization process). The estimate of the recovered desired signal is given by Equation 2:

$$\hat{d}(n) = w_n^T x_n \qquad (2)$$

where $x_n$ is a vector of most recent samples of a sampled signal. Many adaptive techniques can be used for the adaptive equalization filter 26, including Least Mean Squares (LMS), Stochastic Gradient Descent (SGD), Recursive Least Squares (RLS), or Normalized Minimum Least Squares (NMLS).

As previously described, the calibration antenna 6, 16, or 28 is configured to transmit the reference RF signal in the MR frequency band. To do so, the calibration antenna 6, 16, or 28 is arranged respective to the MR coil element 22 such that the MR coil element receives the reference RF signal transmitted by the calibration antenna, and the signal processing chain 26 processes the received reference RF signal to generate a processed reference RF signal. The calibration antenna 6, 16, or 28 is configured to generate the reference RF signal as a phase reversal keying signal (i.e., a 2PSK signal), although other suitable signals can be used, such as a since signal or other reference RF signal with sufficient power spanning the bandwidth to be equalized.

As discussed, the calibration antenna can be implemented in a variety of manners. In one example embodiment, the calibration antenna comprises a pick-up coil disposed in the bore 12. In another example embodiment, the calibration antenna comprises the body coil 6 arranged concentrically with the bore 12. In both of these embodiments, the MR coil element 22 are disposed in the bore 12. In yet another embodiment, the calibration antenna comprises a coil element 28 disposed on the MR coil 18 itself. In this latter embodiment, the coil element 28 may be a dedicated calibration antenna, or may be the coil element of another MR channel that is temporarily re-purposed to serve as the calibration antenna for calibrating another MR channel. (It will be appreciated that in this case, to equalize all channels of a multi-channel coil, at least two of the MR channels will need to include the radio transmitter 38 and appropriate transmit/receive switching, since an MR channel cannot serve as the calibration antenna for calibrating itself).

Advantageously, the disclosed equalization operates on the processed reference RF signal which is processed by both reception via the coil element 22 and processing by the electronic processing chain 24). As a result, the equalization process can flatten (i.e., equalize) the response of the entire MR receive channel 20, not just the response of the signal processing chain 24. This is advantageous because MR coil element 22 also (in general) has a frequency-dependent response.

In the illustrative embodiments, an MR receive coil is calibrated. However, the approach can also be used to calibrate (i.e., equalize) a transmit coil used to excite MR resonance in the imaging subject. For equalizing a transmit coil, the reference RF signal (which is preferably flat over the MR frequency band) is input to a channel of the transmit coil and processed by the electronic signal processing chain 24, and then transmitted by the MR coil element 22 (which in this embodiment is operating as a transmitter) and received by the calibration antenna 28 (or by one of the pickup coils 16 or some other calibration antenna). In this embodiment, the reference RF signal received by the calibration antenna is communicated back to the equalizer electronics 30 and the equalizer electronics 30 are configured to adjust the equalization filter 26 so that the outputted RF signal is flat.

As previously discussed, in the embodiment of FIG. 2, the MR coil elements set 30 and the coil electronics 34 can be constructed as an integral assembly. The coil electronics 34 can include, for example, the equalizer electronics 30, and the electronic signal processing chains for the MR coil elements set of the coil 18, including the illustrative electronic signal processing chain 24 for the MR coil element 22. The coil electronics 34 also optionally include the radio transmitter 38 including a digital-to-analog (DAC) converter 40 coupled to the "different" MR coil element 32 of the MR coil elements set 30. The radio transmitter 38 is configured to energize the different MR coil element 32 of the MR coil elements set 30 to transmit the reference RF signal. In some embodiments, some or all of the coil electronics 34 comprise a Field-Programmable Gate Array (FPGA).

Figure 4:
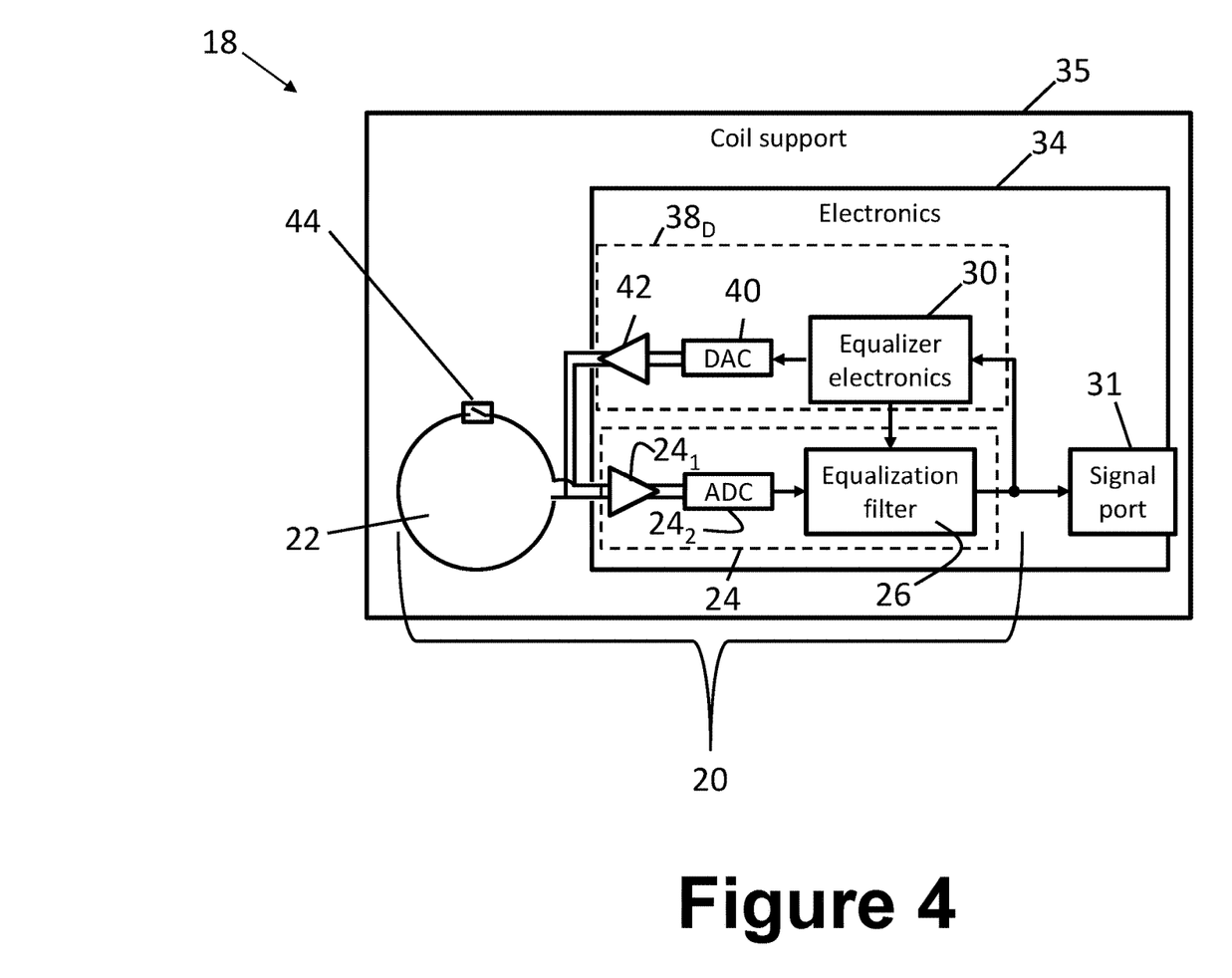
FIG. 4 diagrammatically illustrates another embodiment of a MR imaging device including a MR coil in accordance with the present disclosure.

In other embodiments, as shown in FIG. 4, the signal injector can comprise a directly-wired signal injector 38D, which is wired to input the reference RF signal to the signal processing chain 24 without the use of a calibration antenna. In the embodiment shown in FIG. 4, the signal injector 38D injects the signal into the input of the pre-amplifier 24I, and therefore bypasses the coil element 22. During the injection of the reference signal, a switch 44 disposed on a portion of the coil element 22 detunes or deactivates the coil element 22 so that it does not interfere with the injection of the reference signal. The switch 44 can be a toggle switch operable between and open and closed state to electrically connect the coil element 22 to the radio transmitter 38. The switch 44 can be, for example, a diode switch or any other suitable switch.

Figure 5:
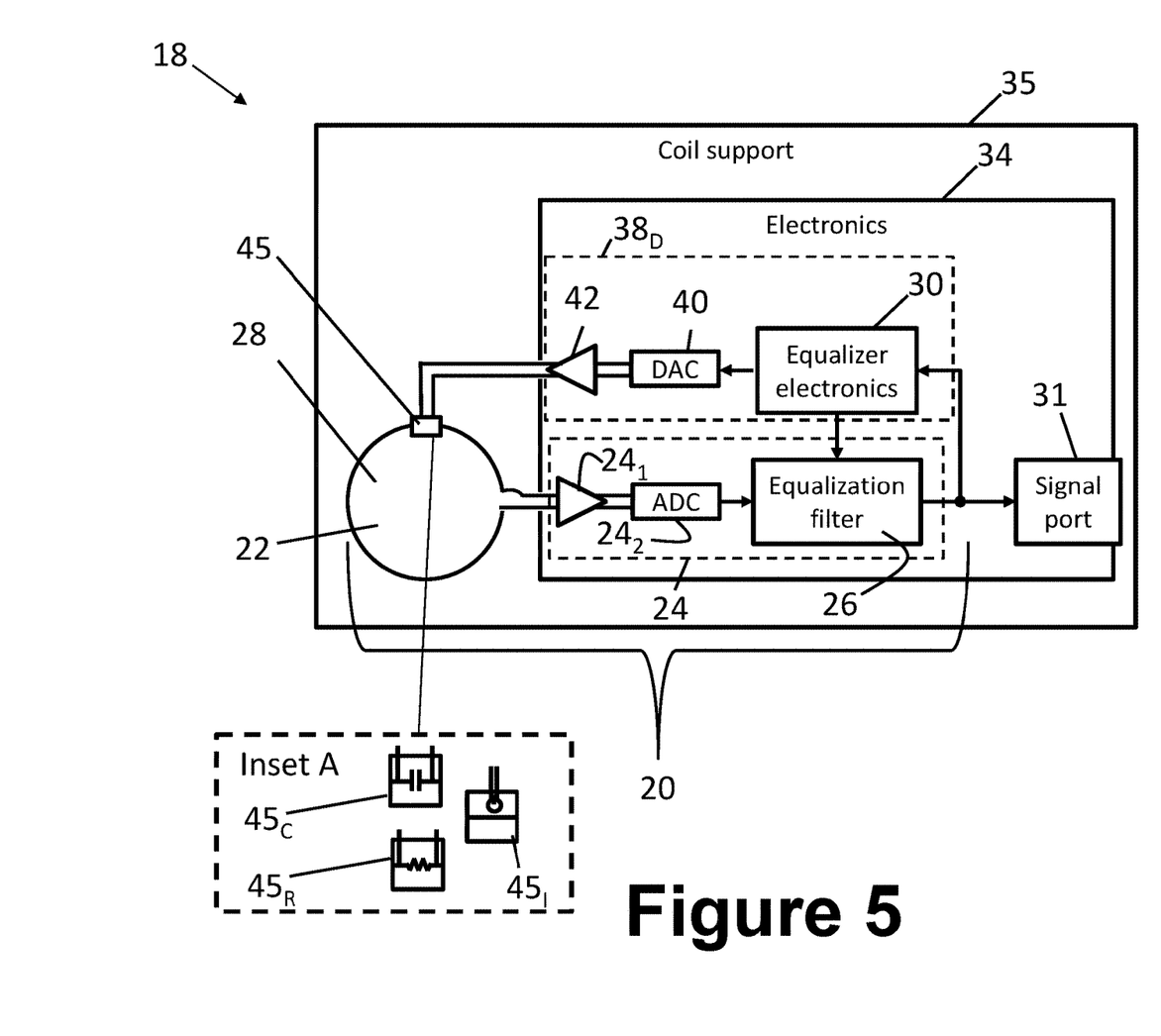
FIG. 5 diagrammatically illustrates another embodiment of a MR imaging device including a MR coil in accordance with the present disclosure.

FIG. 5 shows another embodiment of the coil 18 which employs direct injection of the reference signal without the use of a calibration antenna. FIG. 5 depicts the embodiment where the coil element 22 comprises the calibration antenna 28. Here, the signal injection does not bypass the coil element 22, but rather the reference signal is directly injected into the coil element 22. The switch 44 of FIG. 4 is replaced in the embodiment of FIG. 5 by a suitable coupling sub-circuit 45 coupling with the coil element 22. The coupling sub-circuit 45 can take various forms. As shown in the INSET A of FIG. 5, the coupling sub-circuit 45 for the signal injection can be by way of a wired connection 43 to the coil element 28 may be across a resistor 45R, a capacitor 45c, or some combination thereof. Alternatively, as further shown in INSET A, the coupling sub-circuit 45 providing the signal injection may be a non-galvanic connection by way of a small inductive element 45I that is inductively coupled with the coil element 22.

Figure 6:
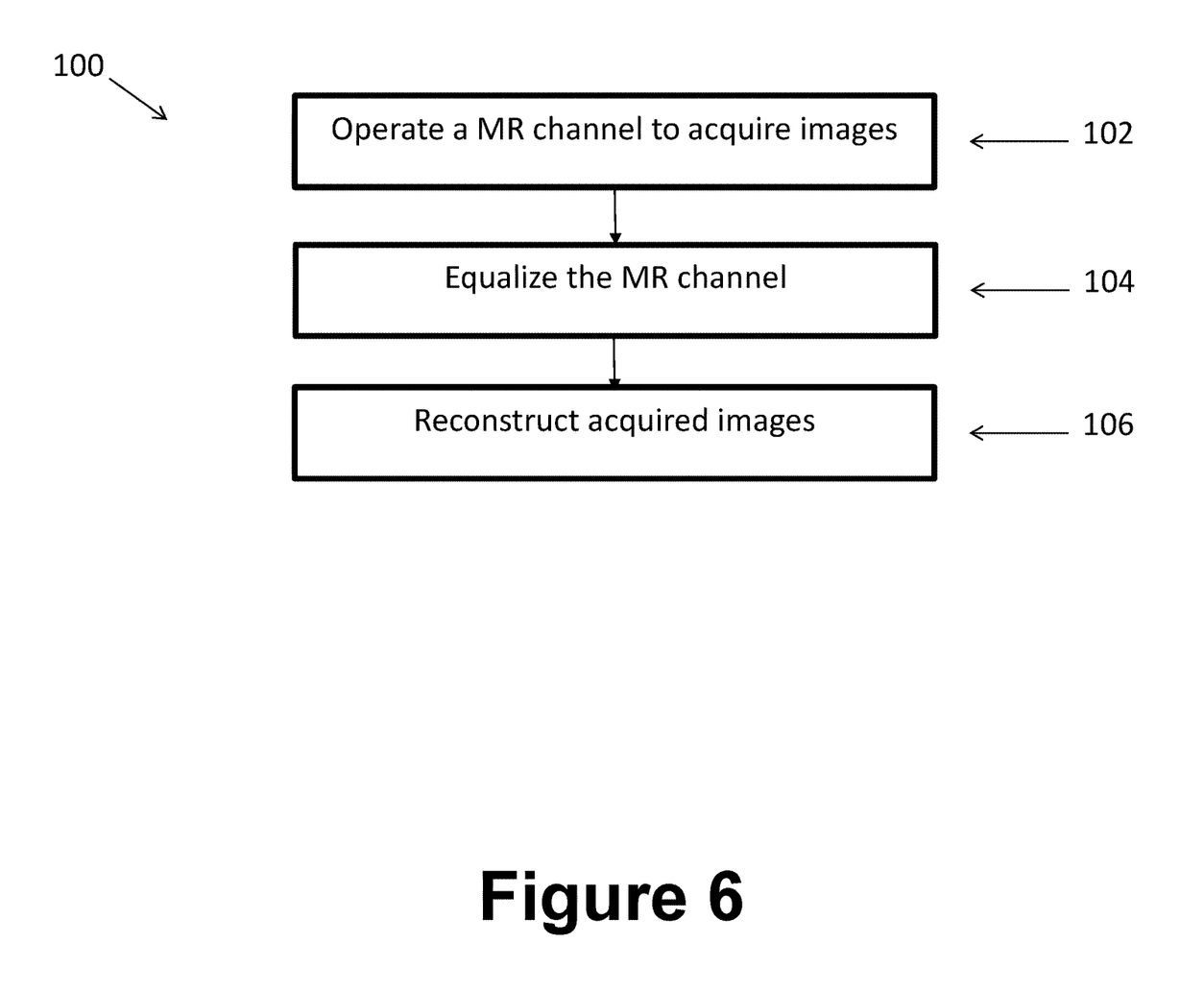
FIG. 6 diagrammatically illustrates an MRI imaging method using the device of FIG. 1.

With reference to FIG. 6, an illustrative imaging method 100 using the MR device 10 is diagrammatically shown as a flowchart. To being the method 100, a patient is loaded onto the couch 14 and into the bore 12. The coil element 22 is placed onto the patient. At an operation 102, the MR channel 20 is operated to either receive MR signals generated by the patient, or transmit MR excitation signals into the patient whereby MR signals are generated by the patient. During the operation 102, a plurality of images is acquired of the patient. At an operation 104, the MR channel 20 is equalized over an MR frequency band by adjusting the equalization filter 26 based on a reference RF signal that has been either (i) received by the MR coil element 22 and then processed by the electronic signal processing chain 24, or (ii) processed by the electronic signal processing chain 24 and then transmitted by the MR coil element 22 and received by the calibration antenna 28. This equalizing operation 104 can be repeated before acquiring each image of the plurality of images at the operation 102. At an operation 106, the images are reconstructed based on the MR signals generated by the patient.

The disclosure has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A magnetic resonance (MR) system, comprising:
an MR receive channel including:
an MR coil element configured to receive MR signals in an MR frequency band;
an electronic signal processing chain configured to process the MR signals received by the MR coil element to produce processed MR signals, wherein the electronic signal processing chain includes an equalization filter; and
a signal injector configured to input a reference radio frequency (RF) signal in the MR frequency band to the signal processing chain, wherein the signal processing chain processes the reference RF signal to generate a processed reference RF signal; and
equalizer electronics configured to adjust the equalization filter based at least on the processed reference RF signal such that the MR receive channel has a flat frequency response over the MR frequency band.

2. The MR system of claim 1, wherein the signal injector includes:
a calibration antenna configured to transmit a reference radio frequency (RF) signal in the MR frequency band, the calibration antenna being arranged respective to the MR coil element such that the MR coil element receives the reference RF signal transmitted by the calibration antenna and the signal processing chain processes the received reference RF signal to generate a processed reference RF signal.

3. The MR system of claim 2, further comprising:
an MR coil array having a MR coil elements set that includes the MR coil element;
wherein the calibration antenna comprises a different MR coil element of the MR coil elements set that is different from the MR coil element.

4. The MR system of claim 3, wherein the MR coil array comprises the MR coil elements set and coil electronics as an integral assembly, wherein the coil electronics include:
the equalizer electronics;
electronic signal processing chains for the MR coil elements set including the electronic signal processing chain for the MR coil element; and
a radio transmitter including a digital-to-analog (DAC) converter coupled to the different MR coil element of the MR coil elements set, wherein the signal injector further includes the radio transmitter and is configured to energize the different MR coil element of the MR coil elements set to transmit the reference RF signal.

5. The MR system of claim 2, comprising an MR imaging device having a bore wherein the calibration antenna comprises:
a pick-up coil disposed in the bore of the MR imaging device, the MR coil element also being disposed in the bore of the MR imaging device.

6. The MR system of claim 2, comprising an MR imaging device having a bore wherein the at least one calibration antenna comprises:
a body coil arranged concentrically with a bore of an MR imaging device, the MR coil element being disposed in the bore of the MR imaging device.

7. The MR system of claim 4, wherein the coil electronics comprise a Field-Programmable Gate Array (FPGA) or a digital signal processor (DSP).

8. The MR system of claim 1, comprising a MR coil array, and wherein the equalizer electronics are configured to adjust the equalization filter further based on the reference RF signal.

9. The MR system of claim 1, further comprising:
a magnet configured to generate a static magnetic field in an examination region; and
magnetic field gradient coils configured to superimpose magnetic field gradients on the static magnetic field in the examination region;
wherein the MR coil element is configured to be disposed in the examination region.

10. The MR system of claim 1, wherein the signal injector is wired to input the reference RF signal to the signal processing chain without use of a calibration antenna configured to transmit a reference radio frequency (RF) signal in the MR frequency band.

11. A magnetic resonance system, comprising:
an MR channel including an MR coil element and an electronic signal processing chain, wherein the electronic signal processing chain includes an equalization filter; and
equalizer electronics configured to equalize the MR channel over an MR frequency band by adjusting the equalization filter based on a processed reference RF signal that has been one of:
(i) received by the MR coil element and then processed by the electronic signal processing chain; or
(ii) processed by the electronic signal processing chain and then transmitted by the MR coil element and received by an associated signal injector.

12. The MR system of claim 11, wherein the equalizer electronics are configured to adjust the equalization filter based on the processed reference RF signal that has been received by the MR coil element and then processed by the electronic signal processing chain.

13. The MR system of claim 12, wherein the equalizer electronics are configured to adjust the equalization filter of the MR channel further based on the reference RF signal before being received by the MR coil element and then processed by the electronic signal processing chain.

14. The MR system of claim 12, further comprising:
an MR coil array having a MR coil elements set that includes the MR coil element;
wherein the signal injector comprises a calibration antenna that comprises a different MR coil element of the MR coil elements set that is different from the MR coil element.

15. The MR system of claim 14, wherein the MR coil array comprises the MR coil elements set and coil electronics as an integral assembly, wherein the coil electronics include:
the equalizer electronics; and
electronic signal processing chains for the MR coil elements set including the electronic signal processing chain for the MR coil element, and
a radio transmitter-including a digital-to-analog (DAC) converter coupled to the different MR coil element of the MR coil elements set, wherein the signal injector comprises the radio transmitter and is configured to energize the different MR coil element of the MR coil elements set to transmit the reference RF signal that is then received by the MR coil element and then processed by the electronic signal processing chain.

16. The MR system of claim 11, wherein the equalizer electronics are configured to adjust the equalization filter of the MR channel based on the processed reference RF signal that has been processed by the electronic signal processing chain and then transmitted by the MR coil element and received by an associated calibration antenna.

17. The MR system of claim 16, wherein the equalizer electronics are configured to adjust the equalization filter of the MR channel further based on the reference RF signal before being processed by the electronic signal processing chain and then transmitted by the MR coil element and received by the associated calibration antenna.

18. A magnetic resonance method, comprising:
operating an MR channel including an MR coil element and an electronic signal processing chain with an equalization filter to one of (i) receive MR signals generated by patient or (ii) transmit MR excitation signals into a patient whereby MR signals are generated by the patient; and
equalizing the MR channel over an MR frequency band by adjusting the equalization filter based on a reference RF signal that has been one of (i) received by the MR coil element and then processed by the electronic signal processing chain or (ii) processed by the electronic signal processing chain and then transmitted by the MR coil and received by an associated calibration antenna.

19. The MR method of claim 18, further comprising:
placing the MR coil element on a patient, wherein the equalizing is performed after placing the MR coil element on the patient; and
reconstructing an image of the patient based on the MR signals generated by the patient.

20. The MR method of claim 18, further comprising:
acquiring a plurality of images of a patient to which the MR coil element is coupled wherein acquiring includes the operating of the MR channel;
wherein the equalizing is repeated before acquiring each image of the plurality of images.

* * * * *